Nov. 30, 1971
T. O. PAINE
ADMINISTRATOR OF THE NATIONAL AERONAUTICS
AND SPACE ADMINISTRATION
FRANGIBLE LINK
Filed Jan. 28, 1970
3,623,394
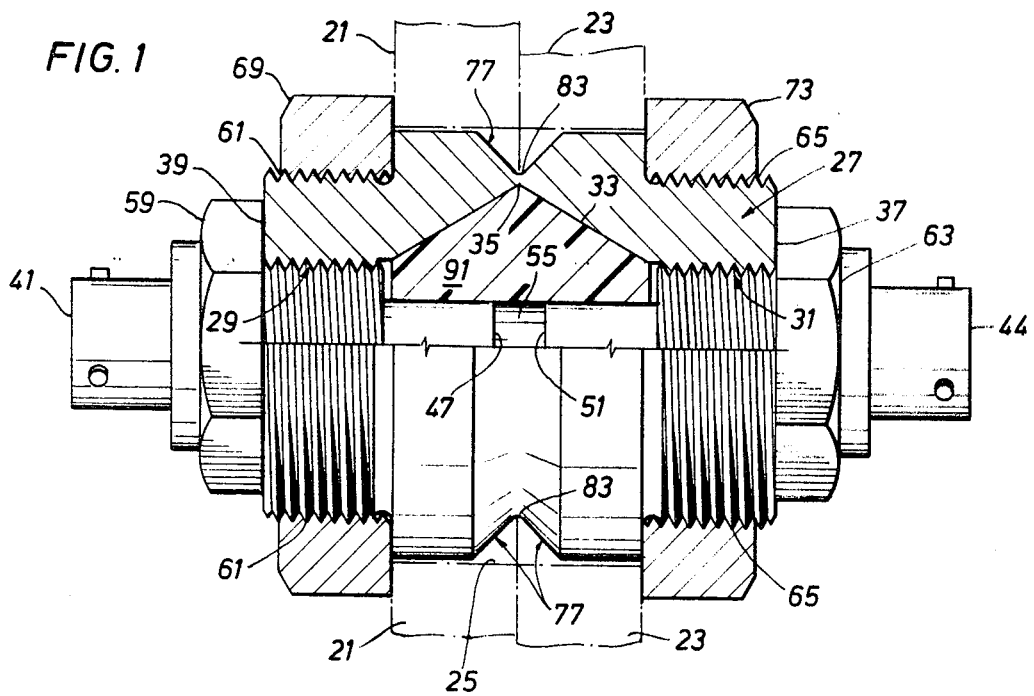
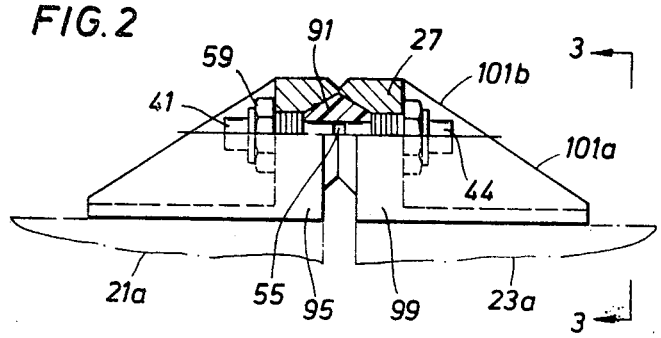
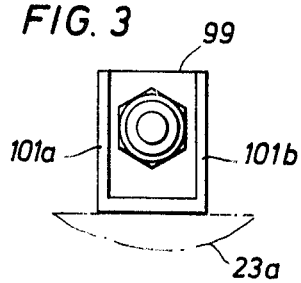
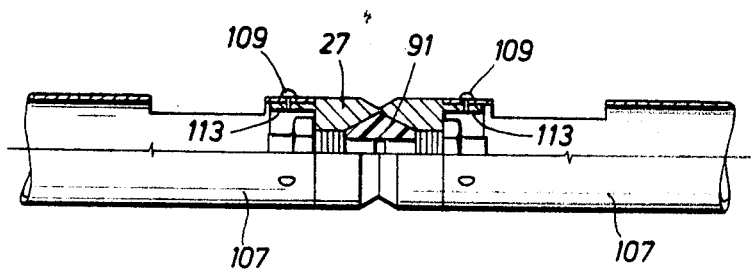
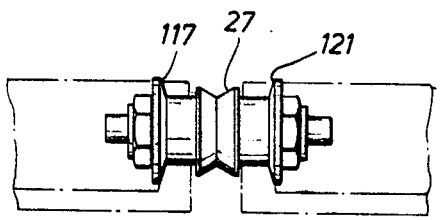
David W. Murphy
INVENTOR
BY
ATTORNEYS

United States Patent Office 3,623,394
Patented Nov. 30, 1971

3,623,394
FRANGIBLE LINK
Thomas O. Paine, Administrator of the National Aeronautics and Space Administration, with respect to an invention of David W. Murphy, Garden Grove, Calif.
Filed Jan. 28, 1970, Ser. No. 6,617
Int. Cl. F16b 35/00
U.S. Cl. 85—1
1 Claim

ABSTRACT OF THE DISCLOSURE

A frangible connecting link for securing together two separable structural members such as two stages of a multi-stage missile. The link may take the form of a threaded fastener having a through bore with female threads on each end of the bore. Explosive detonators are disposed in each threaded end. Midway between the bores is a V-shaped trough cut about the bore periphery. A V-shaped trough is also cut around the outside periphery of the link with the apices of each trough being in radial alignment. An elastomer ring is molded into the internal trough and is of such shape as to provide a small cylindrical space between opposing faces of the respective detonators. Ignition of either detonator produces a gas pressure within the space and thereby exerts a tensile force between the trough apices via the elastomer ring, thereby causing structural failure along a single plane.

---

The invention described herein was made in the performance of work under a NASA Contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates generally to an explosive bolt or similar connecting means for releasably fastening walls or structural members together so that, upon remote actuation, detonation of the bolt is effected in order to cause instantaneous separation of the walls or bodies at a desired time.

Fastening means of the type under consideration are commonly employed for the release of separable components of equipment such as the stages of multi-stage rockets. More particularly, it is commonly known that after a booster rocket has exhausted its fuel supply it is necessary to release the booster from the missile by remote control. The fasteners or bolts used for accomplishing this function are typically characterized by a bored out center for receiving an explosive charge. Upon command, the explosive in the bolt is detonated so as to rupture the bolt body and thereby effect separation of the booster stages. Although such devices as these are clearly not of such complex function as to be the subject of concerted scientific effort, it is just as clear that their effective operation is essential and vital to the success of any given mission. Therefore, it is necessary to characterize these fasteners with certain degrees of refinement not ordinarily present in such a device in order that the utmost reliability may be accomplished in the instantaneous separation of the stages. Heretofore, in order to provide reliability, two charges have commonly been used in one bolt, one on each end, so as to obtain a double break and hence, a redundant action. Also, explosive bolts are conventionally overloaded in order to insure reliability. The result is that upon explosion, the excessive explosive force frequently results in damage to sensitive missile parts as a consequence of shock transmitted through the structure. Therefore, overloading of the explosive bolt may insure reliability of the explosion but the cost of doing such is prohibitive in terms of the forces introduced.

SUMMARY OF THE INVENTION

The present invention either obviates or improves upon all of the problems and disadvantages characteristic of prior explosive fasteners. It provides for unerring reliability in operation because of a dual explosive charge disposed one on each side of the bolt. Intermediate the explosive charges and on the perimeter of the bolt is a channeled section of reduced strength which is adapted to be fractured upon ignition of the charges. Internally of the bolt is an elastomer body which effectively transmits the concussive force of explosion to the weakened area of the bolt immediately adjacent the channeled section. Upon ignition, therefore, the elastomer insert within the bolt provides for the instantaneous transmission of tensile forces which effectively snap the integral structure of the connecting bolt into a clean break which is characterized, due to the single separation plane, by the substantial absence of any hard fragments from the bolt and soft fragments from the elastomer, also.

It is therefore an object of this invention to provide a bolt type fastener which is operable remotely so as to release joined sections in a manner whereby no contaminants or fragments are released in the process of the explosion.

It is another object of the invention to provide a bolt type fastener which may be utilized in a variety of structural connections such as torque tubes and flange type connections.

It is another object of the invention to provide an explosive fastener in which there is produced a tensile failure along a single plane without the introduction of extraneously directed shock forces.

It is still another object of the present invention to provide an explosive fastener characterized by a hollow frangible link having a V-shaped trough cut partially therethrough and filled with an elastomer insert or ring for absorbing the forces of explosion while at the same time imparting tensile forces to the existing structure so as to break it in two with substantially no disintegration.

These and numerous other features and objects of the invention will become readily apparent upon a reading of the foregoing specification, claim and drawing, wherein like numerals denote like parts in the several views and in which:

DESCRIPTION OF THE DRAWINGS

FIG. 1 illustrates a longitudinal partial cross section of the improved frangible link of the invention.

FIG. 2 illustrates the frangible link of FIG. 1 used in coupling relationship with a pair of flanged bodies.

FIG. 3 is an end view of the frangible link and flanged bodies of FIG. 2.

FIG. 4 shows the frangible link of FIG. 1 when used as a coupling for either a torque or tension tube.

FIG. 5 illustrates the frangible link of FIG. 1 having built-in coupling surfaces so as to be used in connecting bodies in spaced relationship to one another.

DETAILED DESCRIPTION

As mentioned hereinabove, one of the primary objectives of the present invention is to provide a frangible link characterized by the reliability of a redundant charge but which has a single separation plane so that there is not ejected, upon detonation, any particles of the characteristic high velocity "slug". Such a device is illustrated, in the preferred form, in FIG. 1 wherein there is shown the two separable members 21, 23 which may for example be the booster rocket and the second stage of a multi-stage ballistic or interplanetary vehicle. Each of the separable members is characterized by an aligned aperture through which there is inserted the frangible fitting 27. The fitting 27 comprises a tubular like member having a through-bore which is threaded as at 29, 31 adjacent the ends thereof. Intermediate the threads 29, 31 is a V-shaped trough 33 which is disposed with its apex 35 substantially midway between the ends 37, 39 of the fitting. Threadedly inserted into the fitting 27 and in engaging relationship with threads 29, 31 are a pair of shock wave emission devices such as pyrotechnic detonators 41, 44, the interior faces 47, 51 of which are positioned in spaced relationship to one another so as to define a resident volume 55. The detonators 41, 44 are fixedly positioned with respect to one another by means of the detonator flanges 59, 63 whose function it is also to insure the maintenance of resident volume 55 upon installation of the detonators.

The outside surface of the frangible fitting 27 is characterized by the threaded means 61, 65 at each end thereof. The threaded means 61, 65 are adapted to receive the fixing nuts 69, 73, the function of which is to clampingly engage the separable members 21, 23 together and at the same time fixedly dispose the frangible link 27 within the aligned apertures 25 of each of the members. The external surface of the fitting 27 is further characterized by an inwardly directed V-shaped trough 77, the apex 83 of which is in redially aligned relationship to the apex 35 of trough 33. There is thus provided between the radially aligned apices 35, 83 a reduced cross sectional area whose structural strength is obviously substantially less than the structural strength of other areas of frangible fitting 27.

In order to transmit the forces of explosion to the frangible fitting 27 an elastomeric body 91 of annular configuration is molded within the surface of trough 33. The walls of trough 33 should be disposed at about a 30° angle with respect to the longitudinal axis in order to produce effective failure of the fitting without fragmentation. The elastomeric body 91 is adapted to rest upon the longitudinal surface of the deonators 41, 44 and in this manner define the central resident volume 55 of cylindrical form mentioned hereinabove.

Reference may now be made to FIGS. 2 through 5 wherein there is shown the frangible fitting of FIG. 1 as it may be used in varying structural connections. In FIGS. 2 and 3 for example, the fitting 27 is an integral part of the flanged sections 95, 99 of the separable members 21(a), 23(a). The flanged sections are reinforced by conventional web means 101(a), (b). The detonators 41 and 44 are inserted between the webs 101(a), (b) in a threaded aperture of the flanged bodies 95, 99. In FIG. 4 there is shown yet another use for the frangible link of the invention, this being in conjunction with a conventional torque or tension tube. The fitting engages the surface of the tube 107 by means of screws 109 which are adapted to fit through the wall of the tube and into an extending flange 113 of the fitting 27. In this manner, torque transmission is achieved through the fitting at the point of intended fracture since this point may be made as thick as the wall of the tube itself or as thick as necessary to transmit the required torque forces. Still another illustrative embodiment of the fitting 27 is shown in FIG. 5 wherein preformed coupling surfaces 117, 121 are constructed on each side of the fitting in order to engage cooperating surfaces on the walls of the separable members such as washers and spacers, respectively. This fitting arrangement is adapted for structures intended to be placed in spaced relationship to one another.

In accordance with the invention, ignition of either or both of the detonators 41, 44 causes an explosion and concomitant creation of high pressure within the resident volume 55. The pressure exerts itself upon the elastomeric body 91 which may be made of urethane or other elastomer. In so doing, the pressure is transmitted via the elastomer to the shaped walls of the trough 33. Because of the angular relationship of the walls to one another, the exertion of pressure thereon causes an instantaneous fracture at the weakest area thereof, namely the stress concentration area defined between the apex 83 of the exterior trough 77 and the apex 35 of interior trough 33. The fracturing occurs simultaneously circumferentially about the link so that there is instantaneously presented a complete separation of the missile stages or other separable members. It may be here pointed out that transmission of the explosive forces through the elastomer completely obviates the direct impact of explosive forces upon the frangible link and in this manner there is obviated the disintegrating characteristic so prevalent with frangible links heretofore. In the present link the explosive forces are merely transmitted through the elastomeric body 91 as a compression type wave and exerted in a pulsating type action as an axially directed tensile stress upon the weakened section of the link. There is thus provided a redundant frangible link having a single fracture line wherein substantially no residual fragmentation can occur due to the shock of explosion.

Although the invention has been described with reference to a particular embodiment which may be used in any number of different types of connections, it will be recognized that numerous of the details herein may be varied and modified within the scope of this invention and within the concept embraced by the claim appended hereto.

That which is claimed and desired to be secured by United States Letters Patent is:

1. A frangible link for securing together two separable structural members such as two stages of a multistage missile, the link comprising:

a tubular member;

a V-shaped annular groove cut about the outer periphery of the tubular member midway between the end portions thereof and a V-shaped annular groove in the bore, the bottoms of the two grooves being diametrically aligned;

an explosive detonator disposed in each end portion of the bore, the interior end face of each detonator being in opposed spaced relation to each other;

an elastomer ring molded into the internal groove, the ring providing a small cylindrical free air space between its inner periphery and the opposed end faces of the explosive detonators, whereby ignition of either detonator will produce a gas pressure within the free air space exerting a tensile force through the elastomer ring thereby causing structural failure along a single plane formed by the diametrically aligned bottoms of the two grooves.

References Cited

UNITED STATES PATENTS

| | | | |
|---|---|---|---|
| 3,087,369 | 4/1963 | Butterfield | 85—1 |
| 3,119,302 | 1/1964 | Barr | 89—1.01 |
| 3,237,521 | 3/1966 | Francis | 85—1 XR |
| 3,311,056 | 3/1967 | Noddin | 102—27 |
| 3,352,189 | 11/1967 | Brown | 85—1 |
| 3,408,890 | 11/1968 | Bochman, Jr. | 85—1 |
| 3,486,410 | 12/1969 | Drexelius et al. | 89—1 |

THOMAS F. CALLAGHAN, Primary Examiner

A. V. KUNDRAT, Assistant Examiner

U.S. Cl. X.R.

287—189.36